United States Patent [19]

Salje et al.

[11] Patent Number: 4,641,561
[45] Date of Patent: Feb. 10, 1987

[54] DISC-SHAPED TOOL

[75] Inventors: Ernst Salje, Schulheide 4, Bendestorf, Fed. Rep. of Germany, D-2106; Jorg Plester, Wendeburg, Fed. Rep. of Germany

[73] Assignee: Ernst Salje, Bendestorf, Fed. Rep. of Germany

[21] Appl. No.: 828,880

[22] Filed: Feb. 13, 1986

[30] Foreign Application Priority Data

Feb. 13, 1985 [DE] Fed. Rep. of Germany ....... 3504826

[51] Int. Cl.[4] .............................................. B27B 33/08
[52] U.S. Cl. ......................................... 83/835; 83/676
[58] Field of Search .................... 83/835–855, 83/676; 76/112; 51/206 R

[56] References Cited

U.S. PATENT DOCUMENTS

| 3,854,364 | 12/1974 | Sundstrom | 83/835 |
| 4,034,639 | 7/1977 | Caldwell | 83/835 |
| 4,201,103 | 5/1980 | Salje et al. | 83/835 |

FOREIGN PATENT DOCUMENTS 3216357 11/1983 Fed. Rep. of Germany .

*Primary Examiner*—Frank T. Yost
*Attorney, Agent, or Firm*—Holman & Stern

[57] ABSTRACT

In order to achieve a secure join between the base and the covering of a disc-shaped tool, e.g. a circular saw, provided with a vibration-reducing structure at least on one side and to prevent the covering of the structure from separating from the base, an edge region of the covering extending into a groove in the base is joined elastically to the base at least in part on the rear and/or end surface by at least one holding element.

9 Claims, 9 Drawing Figures

DISC-SHAPED TOOL

BACKGROUND TO THE INVENTION

1. Field of the Invention

The invention relates to a disc-shaped tool, such as a circular saw, a parting-off grinding disc, or the like, which is provided on its periphery with defined or undefined cutting edges.

2. Description of Prior Art

U.S. Pat. No. 4,201,103 describes circular saw tool having a main blade provided on at least one side with an adhesive layer and a covering arranged thereon. A mechanical holding means which is independent of the adhesive layer and imparts to the adhesive layer a damping capacity under shear stress is provided for the covering.

A particular design of a disc-shaped tool with mechanical holding of the covering is known from German Pat. No. 33 10 434. In this arrangement, the base or the main blade of the tool comprises, at least in one lateral face, a continuous groove into which the covering extends with its outer edge region, and at least one holding element supported on the base overlaps the edge region, extending into the groove, of the covering.

SUMMARY OF THE INVENTION

An object of the invention is to find a further advantageous solution to the problem of achieving a secure join between the main blade or base of the tool and its vibration-reducing structure and of eliminating the risk of separation of the base and covering.

The invention proposes that the covering be joined elastically to the base inside the groove at least in part on the rear and/or on the end by at least one holding element or means.

It has been found that the join between base and covering can be secured particularly advantageously in this way without the need for a holding means which overlaps the covering externally. A design which is particularly simple and convenient to produce is achieved at the same time.

Any element or material which allows a permanent join between covering and base and thus as far as possible imparts the desired damping capacity to the coating may be used as holding means. In particular, the holding means may comprise an adhesive with corresponding properties of elasticity. An adhesive of this type is normally composed of a material different from that of the visco-elastic layer between the base and the covering. However, cases in which the same material or similar materials may be used for the visco-elastic layer and as the holding means are not completely ruled out.

In a particularly advantageous embodiment, the groove has an inclined face, that is completely or partially a conical surface. This produces good contact with a large adhesive face and also represents a design which is desirable in terms of production. An edge region of the covering preferably extends at least in part substantially parallel to the inclined face.

At least one recess, impression, or the like is preferably provided in the groove, for partially receiving the holding means. The holding means is additionally secured by it.

There are also various ways of designing the groove so that differing requirements may be taken into consideration.

For example, the groove may be have an inclined boundary face, a substantially cylindrical boundary face or even an undercut in a region projecting radially beyond the edge of the covering.

In a further advantageous design, the covering has an angled edge or flange which projects into the groove. The join with the base is preferably designed such that the holding means embeds the end face with adjacent regions. In particular, the groove has a substantially rectangular cross-section with rounded corners.

Further details, features, and advantages of the invention are seen from the following description of embodiments shown in the accompanying drawings.

DESCRIPTION OF PREFERRED EMBODIMENTS

Figure 1:
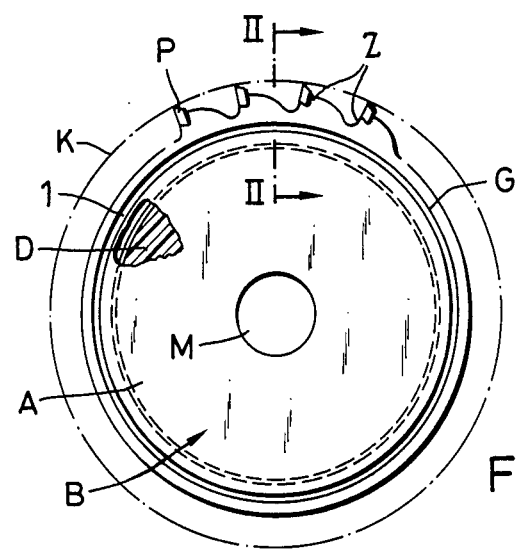
FIG. 1 shows a tool according to the invention in a partially schematic side view, the covering being broken away at one point.

FIG. 1 shows a circular saw tool whose base is a disc-shaped main blade G made of steel and provided with teeth Z on its preriphery. Only a proportion of these teeth which are distributed at regular or even at irregular intervals round the entire periphery is illustrated in each case, the flight circle of the tips of the teeth being indicated by the dot-dash line K. The teeth Z may be provided with soldered cutting plates P of hard metal or another material or may have a different design and thus directly form the cutters of the tool. A central hole is designated by the letter M.

The base G of the tool is provided on both sides with a vibration-reducing structure B, only one of which is shown in FIG. 1. Each of these structures comprises at least one layer D composed of visco-elastic material (in particular a synthetic resin with adhesive properties) and a covering A on it. Such coverings may be composed of steel, non-ferrous metals, metal alloys, and hard substances, but also of plastics materials, in particular those having high resistance to wear, and other suitable materials. They are advantageously designed as a film, for example with a thickness of a few tenths of a millimeter. Furthermore, the thickness of the covering A and the visco-elastic layer D may be selected as a function of the requirement or application of the tool.

A holding means which is independent of the visco-elastic layer D and imparts to it a damping capacity under shear stress is provided for the covering A in such a way that the covering with an edge region 10 penetrating into a groove 1 is joined elastically to the base G inside the groove at least in part on the rear and/or on the end by at least one holding element.

The groove 1 is located in the side face of the base. It is continuous in the peripheral direction and has a shape adapted in its course to the edge of the covering. If the covering has a circular boundary, the groove 1 will therefore also be circular. This is shown in FIG. 1. If the covering has a different edge shape, i.e. an edge shape differing from a circle, the course of the groove is adapted accordingly. The depth of the groove only needs to be sufficiently large to receive the edge region of the covering and the holding element(s) for it in the necessary manner. A thickness of about 0.3 mm is an advantageous example for the covering.

As shown in detail in FIG. 1, the groove 1 in this embodiment has an inclined face 11 (which is therefore a conical face in the case of the circular groove), which forms the basis for the securing join to the covering A. The edge region 10 of the covering penetrating into the groove 1 runs substantially parallel to the inclined face 11. A holding element in the form of a layer 21 of an elastic adhesive is arranged between the face 11 of the groove 1 and the edge region 10 of the covering. A join is thus produced between the rear surface 10a of the edge region 10 and the base G; this join may be subjected to shear stress and permits unobstructed damping by means of the structure B.

Radially outside the edge region 10 of the covering, the groove is restricted by a further inclined face 12 which is approximately at right angles to the face 11. However, a different boundary face may be provided, for example a cylindrical face 13 of the type provided for the groove 2 in the embodiment according to FIG. 3 and indicated in dot-dash lines in FIG. 2.

Figure 3:
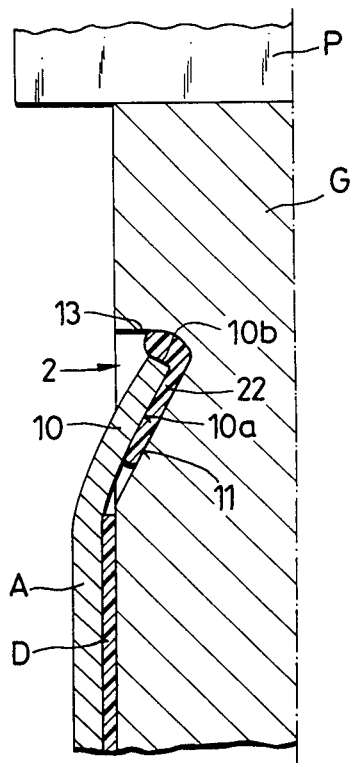
FIGS. 3 to 9 show further embodiments of the tool according to the invention each in a section corresponding to the one shown in FIG. 2.

In the embodiment according to FIG. 3, the elastic join between the edge region 10 of the covering A and the base G is produced by a holding element 22 which, on the rear surface 10a and the outer end surface 10b of the edge region 10, makes contact with the edge region 10 and may be subjected to shear stress and pressure.

In the embodiments described hitherto and in all other embodiments of the tool, the holding element can extend over the entire periphery of the groove or of the edge region of the covering, or several holding elements which are distributed at intervals over the periphery of the groove may be provided, in particular in the form of individual adhesive application points.

Figure 2:
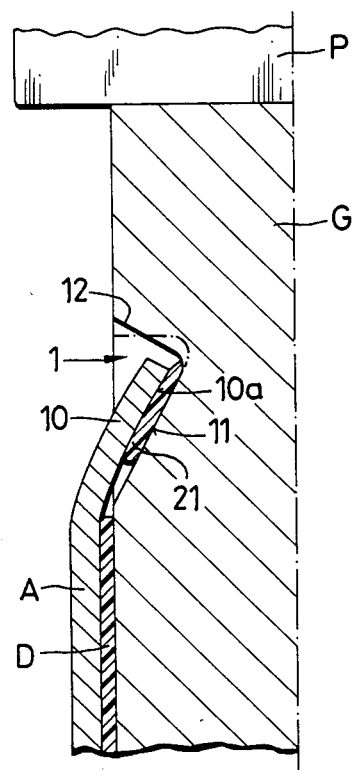
FIG. 2 is a section on line II—II in FIG. 1.
Figure 4:
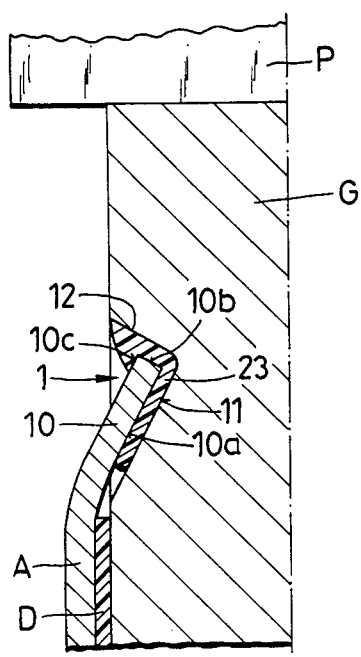

In the embodiment according to FIG. 4, the groove 1 has the same form as in FIG. 2. The holding element 23 makes contact not only with the rear surface 10a and the end surface 10b of the edge region 10 of the covering, but also fills the groove on the face 12 sufficiently to cover a proportion of the front surface 10c of the edge region 10.

Figure 5:
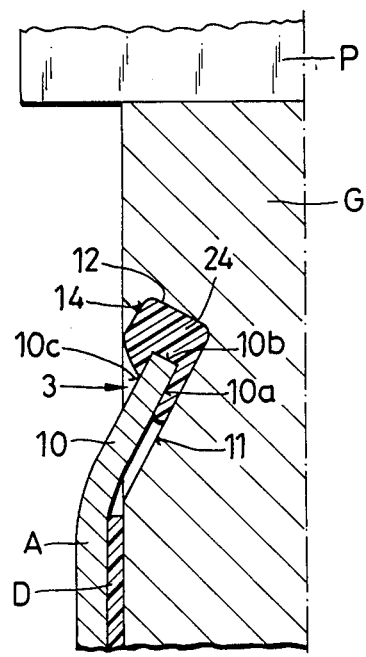

The embodiment according to FIG. 5 corresponds substantially to the one according to FIG. 4; however, the outer face 12 of the groove 3 does not open directly outwards but has an undercut form, resulting in an internal flank 14 so that the material of the holding element 24 is itself further secured especially in its position. The material of the holding element may also be metered and positioned particularly well.

Figure 6:
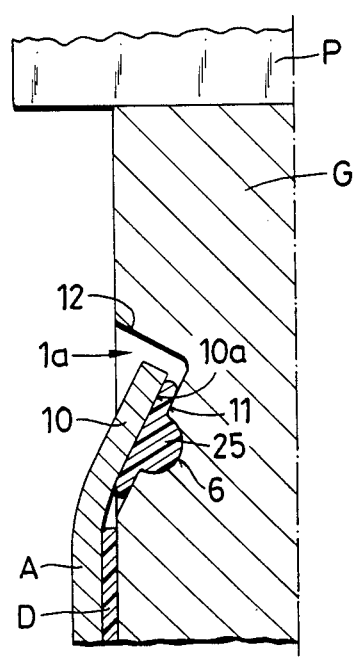
Figure 7:
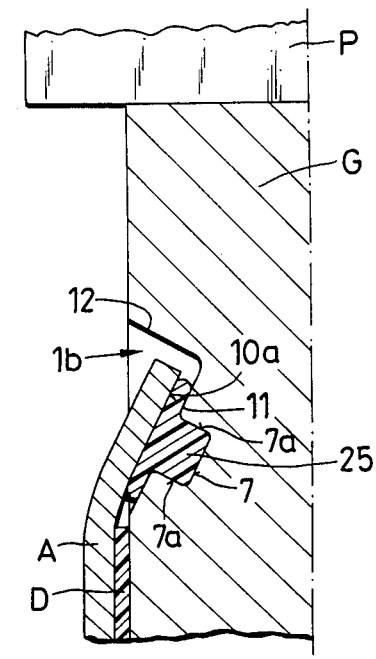

In the embodiments according to FIGS. 6 and 7, the grooves 1a and 1b correspond in form substantially to the groove 1 according to FIGS. 1 and 2, but a further impression or recess is provided in the bottom 11 of the respective groove and receives a proportion of the adhesive or other material provided as a holding element 25. This also allows the material to be positioned particularly well and to be applied purposefully. Further advantages are also achieved with respect to the elasticity of the join. With the embodiment according to FIG. 6, the impression 6 has an approximately semi-circular cross-section, whereas in the embodiment according to FIG. 7, a recess 7 with lateral faces 7a inclined to one another is provided, resulting in an undercut, dovetailed form which contains the holding element particularly securely.

Figure 8:
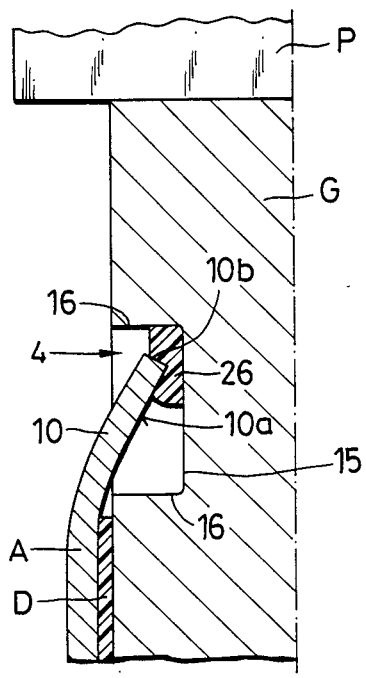

FIG. 8 shows a groove 4 which is approximately rectangular in cross-section with a bottom face 16 and walls 16, a holding member 26, in particular in the form of an adhesive material, lying in one corner of the groove, on the one hand, and making contact with a proportion of the rear surface 10a and with the end surface 10b of the ede region 10 of the covering, on the other hand.

Figure 9:
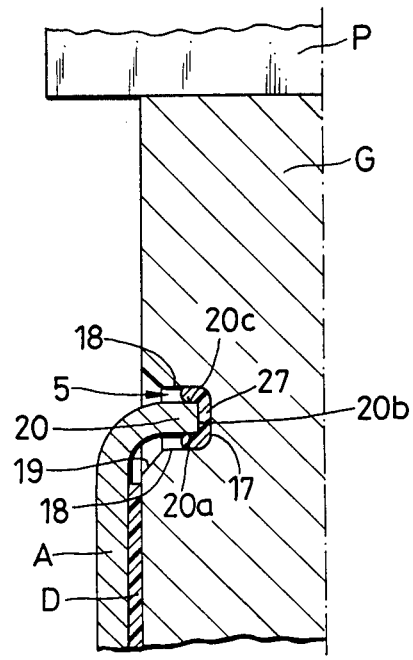

FIG. 9 shows another embodiment of the tool, in which the covering A has an angled edge or flange 20 which engages in a groove 5 and makes contact with a holding element 27 in the form of an adhesive or the like on the end surface 20b and is thus elastically joined to the base G. The holding element 27 covers not only the bottom 17 of the groove but also extends to the lateral walls 18 of the groove 5 so that the edge portion of the covering is embedded in the holding element 27, which thus covers small areas of the lateral surfaces 20a and 20c. The groove 5 may have rounded or bevelled outer edges, as at 19.

All features mentioned in the foregoing description and illustrated in the drawings may be considered alone or in cominations as falling within the invention, insofar as this is permitted by the known prior art.

I claim:

1. A disc-shaped tool comprising a disc-like base, cutting means on the periphery of the tool, a vibration-reducing structure on at least one side of the base, the vibration-reducing structure comprising a layer of visco-elastic material and a covering on it, the base having a continuous groove in the said at least one side, the covering having an outer edge region extending into the groove, and at least one holding means elastically joining at least one of the rear and outer end surfaces of the covering to the base inside the groove.

2. The tool of claim 1, in which the holding means comprises an elastic adhesive.

3. The tool of claim 1, in which the groove has an inclined face as a support for the holding means.

4. The tool of claim 3, in which at least part of an edge region of the covering runs substantially parallel to the inclined face.

5. The tool of claim 1, in which the groove has at least one recess for partially receiving the holding means.

6. The tool of claim 1, in which the groove has an inclined limiting face in a region projecting radially beyond the covering.

7. The tool of claim 1, in which the groove has a substantially cylindrical limiting face in a region projecting radially beyond the covering.

8. The tool of claim 1, in which the groove has an undercut in a region projecting radially beyond the covering.

9. The tool of claim 1, in which the covering has an angled edge which extends into the groove.

* * * * *